United States Patent [19]
Copeland et al.

[11] Patent Number: 5,446,858
[45] Date of Patent: Aug. 29, 1995

[54] AN APPARATUS AND METHOD FOR TRANSFERRING INFORMATION IN BLOCKS FROM A DATABASE TO A MEMORY

[75] Inventors: George P. Copeland; Richard D. Hoffman, both of Austin, Tex.; Timothy R. Malkemus, Unionville, Canada; Marc G. Smith, Austin, Tex.

[73] Assignee: International Business Machines Corporation, Armonk, N.Y.

[21] Appl. No.: 923,679

[22] Filed: Aug. 3, 1992

[51] Int. Cl.6 .................... G06F 12/08; G06F 12/12
[52] U.S. Cl. ................................. 395/427; 395/600; 364/DIG. 1; 364/243.4; 364/243; 364/246.6; 364/246.8
[58] Field of Search ................... 395/425, 600, 725

[56] References Cited

U.S. PATENT DOCUMENTS

| | | | |
|---|---|---|---|
| 4,530,055 | 7/1985 | Hamstra et al. | 395/425 |
| 4,603,380 | 7/1986 | Easton et al. | 395/425 |
| 5,125,086 | 6/1992 | Perazzoli, Jr. | 395/425 |
| 5,202,981 | 4/1993 | Shackelford | 395/600 |
| 5,226,143 | 7/1993 | Baird et al. | 395/425 |
| 5,261,069 | 11/1993 | Wilkinson et al. | 395/425 |

OTHER PUBLICATIONS

Gray, Jim, "Notes on Database Operating Systems," in *Operating Systems: An Advanced Course*, ed. R. Bayer et al., 1977, pp. 394-481.

Smith, Alan Jay, "Cache Memories," *Computing Surveys*, vol. 14, No. 3, Sep. 1982, pp. 473-529.

Primary Examiner—Paul V. Kulik
Attorney, Agent, or Firm—Mark S. Walker; Keith Stephens

[57] ABSTRACT

A method, system and process for providing an improved database blocking technique for updatable and scrollable cursors is disclosed. The invention is facilitated by the operation of a process in the memory of a processor. The processor, under the control of the process, builds a reserved area in the memory of the computer. The reserved area in the memory contains an image of a portion of the information residing on disk in the database. When an application opens a cursor to a database, the type of blocking is specified for that cursor. The application issues a fetch request, and if the row is not in the block in the reserved area in the memory, then a remote procedure call is performed to get the required next block of rows and return the block containing the rows back to the application. Various lock data structures are employed to manage and control the processing.

12 Claims, 7 Drawing Sheets

| 200 | level 0 (no blocking) | level 1 (writethrough) | level 2 (writeback) |
|---|---|---|---|
| Appl process ← blocking DBM Agent | no | yes | yes |
| Appl process → blocking DBM Agent | no | no | yes |
FIG. 2
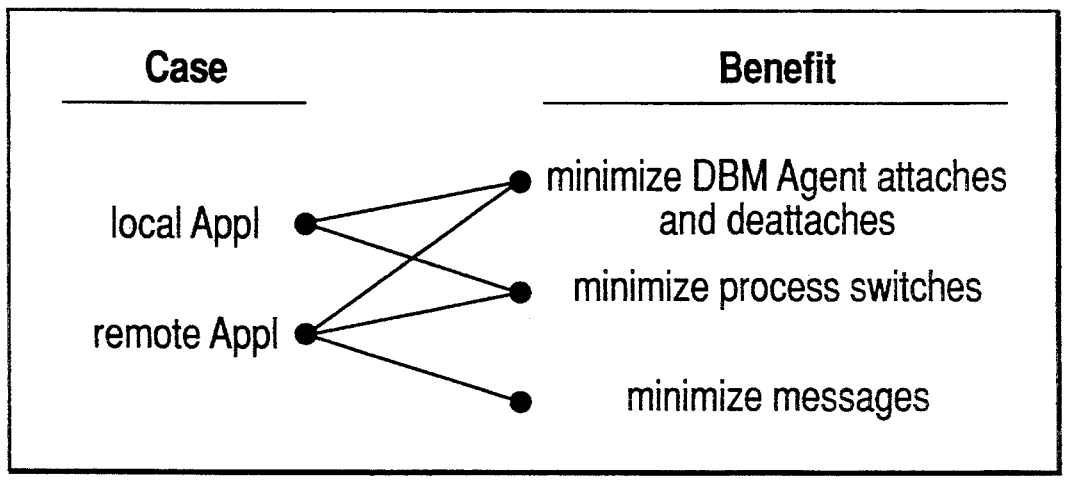
FIG. 3
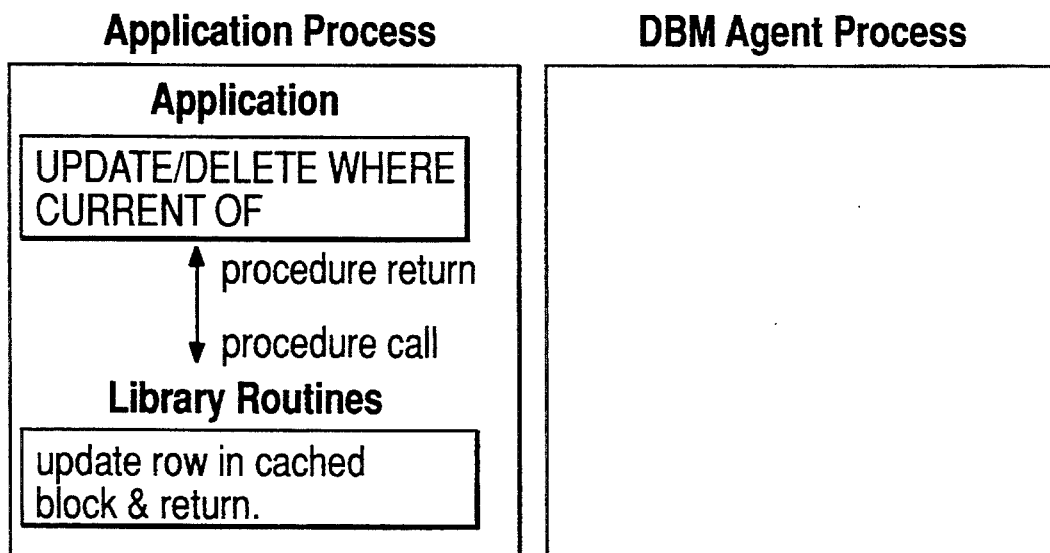
FIG. 6 matrix becomes:

|      | none | IN  | IS  | S   | IX  | SIX | U   | DX  | X   | Z   |
|------|------|-----|-----|-----|-----|-----|-----|-----|-----|-----|
| none | yes  |     |     |     |     |     |     |     |     |     |
| IN   | yes  | yes |     |     |     |     |     |     |     |     |
| IS   | yes  | yes | yes |     |     |     |     |     |     |     |
| S    | yes  | yes | yes | yes |     |     |     |     |     |     |
| IX   | yes  | yes | yes | no  | yes |     |     |     |     |     |
| SIX  | yes  | yes | yes | no  | no  | no  |     |     |     |     |
| U    | yes  | yes | yes | yes | no  | no  | no  |     |     |     |
| DX   | yes  | yes | no  | no  | no  | no  | no  | no  |     |     |
| X    | yes  | yes | no  | no  | no  | no  | no  | no  | no  |     |
| Z    | yes  | no  | no  | no  | no  | no  | no  | no  | no  | no  |

The upper-bound matrix becomes:

|      | none | IN  | IS  | S   | IX  | SIX | U   | DX  | X   | Z   |
|------|------|-----|-----|-----|-----|-----|-----|-----|-----|-----|
| none | none |     |     |     |     |     |     |     |     |     |
| IN   | IN   | IN  |     |     |     |     |     |     |     |     |
| IS   | IS   | IS  | IS  |     |     |     |     |     |     |     |
| S    | S    | S   | S   | S   |     |     |     |     |     |     |
| IX   | IX   | IX  | IX  | SIX | IX  |     |     |     |     |     |
| SIX  | SIX  | SIX | SIX | SIX | SIX | SIX |     |     |     |     |
| U    | U    | U   | U   | U   | SIX | SIX | U   |     |     |     |
| DX   | DX   | DX  | DX  | DX  | DX  | DX  | DX  | DX  |     |     |
| X    | X    | X   | X   | X   | X   | X   | X   | X   | X   |     |
| Z    | Z    | Z   | Z   | Z   | Z   | Z   | Z   | Z   | Z   | Z   |

FIG. 4

AN APPARATUS AND METHOD FOR TRANSFERRING INFORMATION IN BLOCKS FROM A DATABASE TO A MEMORY

FIELD OF THE INVENTION

This invention generally relates to improvements in database accesses and more particularly to reducing the overhead per accessed row using updatable and scrollable cursors.

BACKGROUND OF THE INVENTION

Databases have become the subject of significant recent interest, not only because of the increasing volume of data being stored and retrieved by computerized databases but also by virtue of the data relationships which can be established during the storage and retrieval processes.

Structured Query Language (SQL), and in particular ANSI SQL, has become a preferred language media for communicating queries to relational databases. As a consequence, there presently exist thousands of relational databases and thousands of related queries directed to such databases. Given an investment in such databases and queries, migration is not only a desirable feature, but a substantially necessary capability for new relational database systems and methods.

To a Database Manager (DBM) application program, each fetch of the next row is a separate SQL request. If each row fetch of the next row is implemented as a direct call to the SQL DBM, a large amount of overhead is accrued per request. For local applications resident on a server machine, the per request overhead is two process switches and a DBM Agent process attach and deattach. For a remote application running on a client machine, there is additional overhead associated with the round-trip message per request.

Blocking is an application transparent technique that allows multiple rows at a time to be moved between an application process and a DBM Agent process. Thus, blocking distributes the overhead burden over many rows.

SUMMARY OF THE INVENTION

Accordingly, it is a primary object of the present invention to provide a database blocking technique for updatable and scrollable cursors.

These and other objects of the present invention are accomplished by the operation of a process in the memory of a processor. The processor, under the control of the process, builds a reserved area in the memory of the computer. The reserved area in the memory contains an image of a portion of the information residing on disk in the database. When an application opens a cursor to the database, the type of blocking is specified for the cursor. If writethrough or writeback blocking is requested, then the application issues a fetch request, and if the row is in the reserved area in the memory, then the row is fetched and returned locally without going to the database manager. However, if the row is not in the reserved area in the memory, then a remote procedure call is performed to get the required next block of rows. The database manager modifies the locks on the previous block of information and gets the next block of rows and places them in memory with the appropriate lock structure. The database manager then returns the block containing the rows back to the application. Various lock data structures are employed to manage and control the processing. A row update is handled differently depending on whether writethrough or writeback blocking is selected.

BRIEF DESCRIPTION OF THE DRAWINGS

FIG. 2 illustrates three levels of database blocking in accordance with the subject invention;

FIG. 3 illustrates the efficiency benefits acheived through blocking in accordance with the subject invention;

FIG. 4 illustrates how a DX lock is related to other locks in accordance with the subject invention;

FIG. 6 is a flow diagram for an application process and a database manager process in accordance with the subject invention;

DETAILED DESCRIPTION OF THE INVENTION

Figure 1:
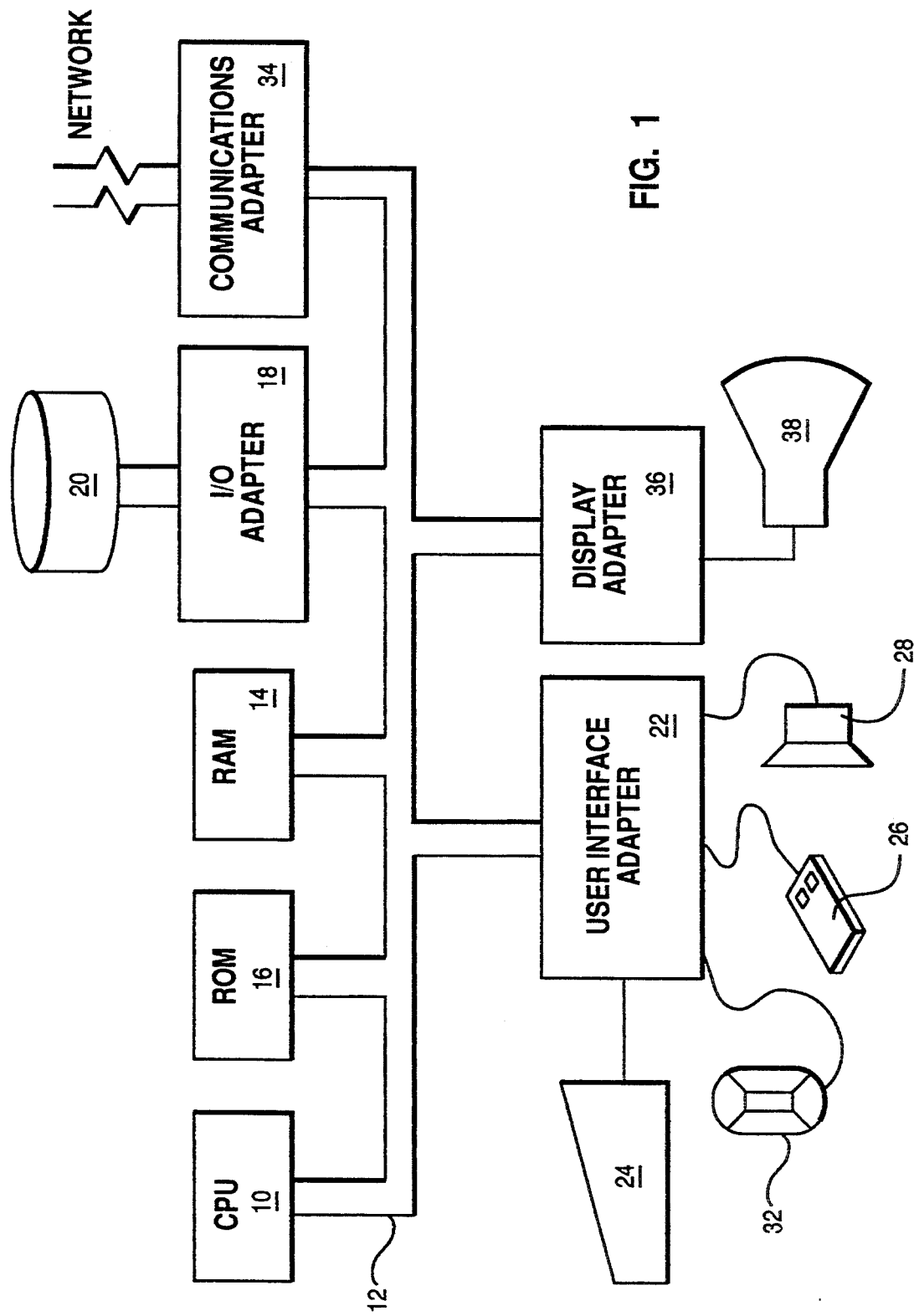
FIG. 1 is a block diagram of a host computer in accordance with the subject invention.

A representative hardware environment is depicted in FIG. 1, which illustrates a typical hardware configuration of a workstation in accordance with the subject invention having a central processing unit 10, such as a conventional microprocessor, and a number of other units interconnected via a system bus 12. The workstation shown in FIG. 1 includes a Random Access Memory (RAM) 14, Read Only Memory (ROM) 16, an I/O adapter 18 for connecting peripheral devices such as disk units 20 to the bus, a user interface adapter 22 for connecting a keyboard 24, a mouse 26, a speaker 28, a microphone 32, and/or other user interface devices such as a touch screen device (not shown) to the bus, a communication adapter 34 for connecting the workstation to a data processing network and a display adapter 36 for connecting the bus to a display device 38.

A source application program (APPL) can access a Database Manager (DBM) using embedded SQL or other database manager commands. After compilation, the SQL statements access the DBM using a set of library routines that execute in the APPL process. The DBM executes in a separate pool of processes from the APPL. Each request is assigned to one of the DBM processes which are referred to as DBM agents. For a local APPL, ie. the APPL executes in the same machine as the DBM, the overhead per DBM request is two process switches as well as an attach and deattach to a SQL process. For a remote APPL, ie. the APPL executes in a different client machine from the DBM, the overhead per DBM request also includes a round trip message. The APPL locally sees a row-at-a-time interface to the DBM. If row-at-a-time is reflected back to the DBM as a separate request, then there is a high overhead per row.

Blocking is a technique to distribute the overhead over many rows. Blocking is accomplished in a manner transparent to the APPL, but the library routines provide a reserved area in the memory management facility within the APPL process. That is, the APPL sees the row-at-a-time interface and the library routines provide reserved area in the memoryd rows without going back to the DBM until a block full of rows has been exhausted. When the block, ie. one or more pages of rows is exhausted, then the library routines send a single request to the DBM for another block of rows. Although multi-row interfaces may be provided directly to the APPL, they require more sophistication by the APPL programmer. Blocking is transparent to the programmer, so that current applications do not require change.

The current DBM for updateable or scrollable cursors provides blocking for read only cursors with only a one-way information flow. After data is used by the APPL, it is discarded. Updatable cursors refers to making a determination of which rows are to be updated at runtime as opposed to making the determination while compiling the application. FIG. 2 illustrates three levels of blocking. Level 0 200, no blocking, is the only option supported in the current DBM. Level I (writethrough) allows blocking only in the read direction, from APPL process to DBM Agent, and each update requires a separate message back to the DBM Agent to synchronously secure a write lock. Level 1 is always more efficient than Level 0. Level 2, writeback, allows blocking in both directions at the price of temporary overlocking. Level 2 can be employed when there are no interrow integrity constraints to be checked.

The benefit in these new blocking techniques is that they provide balancing between the following features:
distributing overhead between multiple row access operations; and
data contingency based on locking data for all reserved area in the memory operations.

FIG. 3 illustrates the benefits of these operations. A local APPL benefits from minimized DBM Agent attaching, deattaching and minimized process switching. A remote APPL also benefits from minimized messaging.

The tradeoff can be made by offering the following options to application developers: choice of level of blocking; and different block sizes. A smaller block size reduces both the advantages and disadvantages of blocking.

Blocking with updatable and/or scrollable cursors is like multiprocessor caching, but with the additional complexity of maintaining the correct level of isolation between transactions. The locking techniques required to maintain isolation between transactions is an important feature of the invention. The locking techniques also ensure reserved area in the memory consistency between transactions by preventing multiple transactions updates of the same data. Other important features of the invention are the additional reserved area in the memory consistency techniques required within a single transaction.

Locking Techniques

Writethrough and writeback blocking have the following complexities that are not encountered in readonly blocking.
Which row: an update must be efficiently returned to the DBM with enough information to include it in the database. This information includes which row and its updated value.
Locks: locks must be maintained efficiently while maintaining the specified level of isolation. For example, whether the lock is for a repeatable read or cursor stability.

It is critical to solve the "which row" problem by shipping between the DBM Agent process and the APPL process something with each row that uniquely identifies the row, and to solve the locks problem of overlocking data while it is being stored in the reserved area in the memory in the APPL process.

The following three levels of isolation are supported by the DBM:
Repeatable-read: two phase locking to guarantee serializability.
Cursor-stability: to guarantee the value of the row currently pointed to by the cursor will not change. It does not guarantee that the criteria for membership of rows in the cursor set will be kept consistent with the current database or with what has already been seen by the APPL.
Uncommitted read: guarantees only that the rows will not be accessed in the middle of another transaction's update.

The following three types of locks are used to implement the invention. S: shared lock, X: nondemotable exclusive lock, DX: demotable exclusive lock. The DBM already supports S and X locks. The DX lock is introduced here to support writethrough blocking. DX has all of the same characteristics as X, except that DX can be demoted to lower levels of locking and X cannot. The lock compatibility matrix and the lock upper bound matrix are illustrated in FIG. 4. The semantics of UPDATE/DELETE WHERE CURRENT OF, the command for updating or deleting the row currently pointed to by the specified cursor, is that a return code with a status OK means that the UPDATE/DELETE WHERE CURRENT OF was completed, which includes getting an X lock on the row. For writethrough blocking, the update or delete processing happens in the reserved area in the memory within the APPL process without going to the DBM Agent until the cursor exits the reserved area in the memory. Then, all updates are sent back together in a single message. To support this processing, DX locks are obtained on all rows that are stored in the reserved area in the memory on the APPL process to reserve the ability to get an X lock in case one is actually required. The distinction between DX and X is needed to note whether a row has actually been updated during a previous visit, for example during another cursor scan or in the same cursor scan with scrolling.

Figure 5:
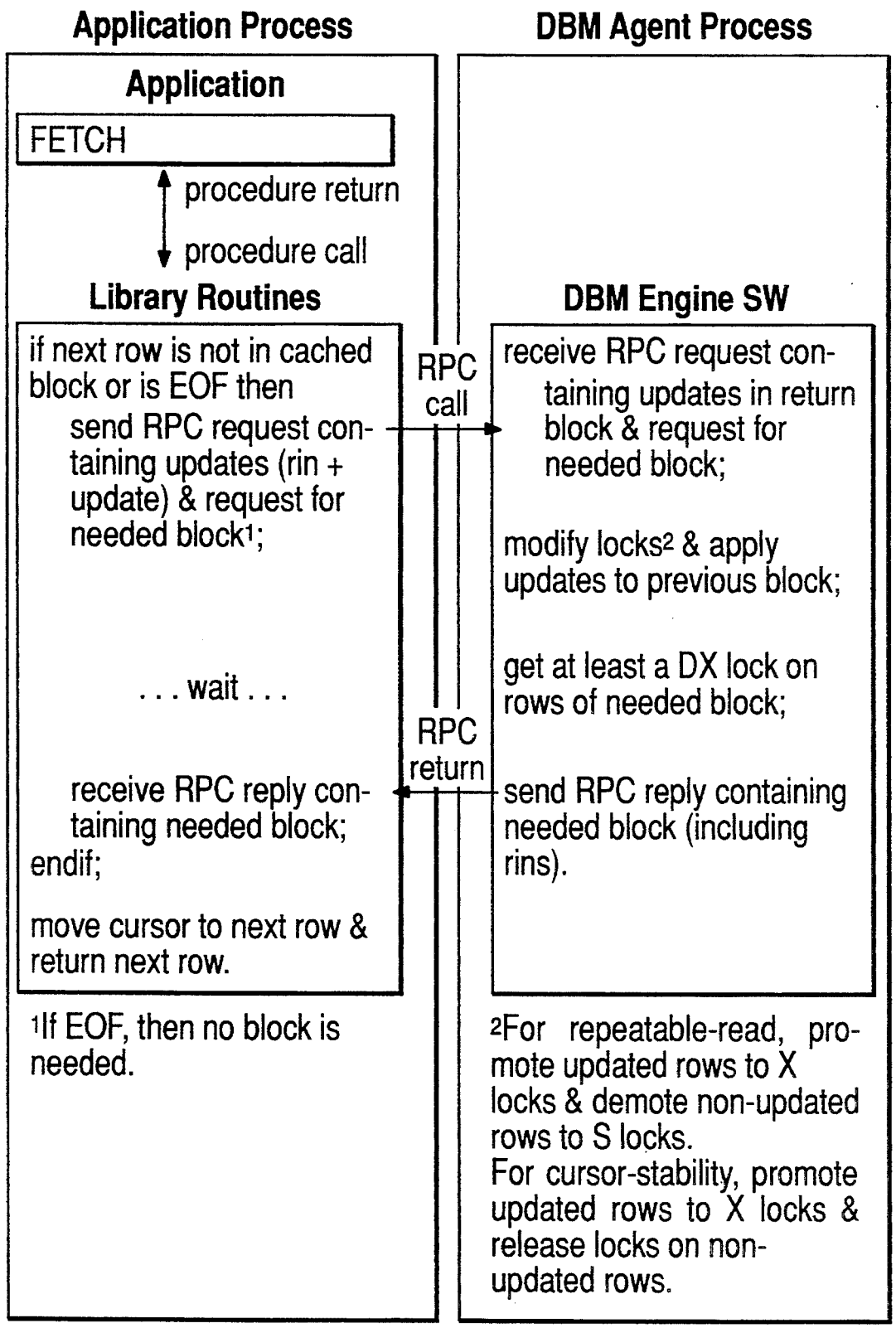
FIG. 5 is a flow diagram for an application process and a database manager process in accordance with the subject invention.

FIG. 5 is an illustration of a flow diagram showing the interaction between an APPL process and a DBM process for a FETCH operation using writeback blocking. The APPL issues a FETCH request via the library routines in the APPL process. The library routines manage the local reserved area in the memory for blocking operations. If the row is in the reserved area in the memory, then it is fetched and returned locally without going to the DBM Agent. Thus, the only overhead incurred is a procedure call to the library routine. If the row is not in the reserved area in the memory, the library routine sends an RPC to the DBM to return any updates in the previous block and to get the required next block of rows. The DBM Agent process assigned to that request receives the RPC. It first applies any updates in the previous block by modifying locks on all rows of the block.

The rules for locking under repeatable-read isolation are:
- If the row had a DX lock on it and the lock was not updated, then demote the lock to S.
- If the row had a DX lock on it and it was updated, then promote its lock to X. Note that a DX lock ensures that this is possible without waiting.
- If the row had an X lock on it, then do not change the lock.

The rules for locking under cursor-stability isolation are:
- If the row had a DX lock on it and it was not updated, then demote its lock to no lock.
- If the row had a DX lock on it and it was not updated, then promote its lock to X. Note that a DX lock ensures that this is possible without waiting.
- If the row had an X lock on it, then do not change the lock.

Next, the DBM Agent gets the next block of rows, which requires getting the appropriate locks. The rules for locking are:
- If the row did not have an X lock, then get a DX lock.
- If the row had an X lock, then no additional locks are necessary.

The DBM process then returns the block containing the rows with their unique identifiers back to the library routines in the APPL process. The APPL process then returns the next row to the APPL. This process continues until an EOF is reached. When this happens, the library routine sends an RPC request to the DBM to return any updates in this block.

FIG. 6 provides a flow diagram for an UPDATE/DELETE WHERE CURRENT OF request for writeback blocking. The APPL issues an UPDATE/DELETE WHERE CURRENT OF request via the library routines in the APPL process. The updated row will always be in the reserved area in the memory and have a DX lock in the DBM, so that the library routine can simply update it locally.

Figure 7:
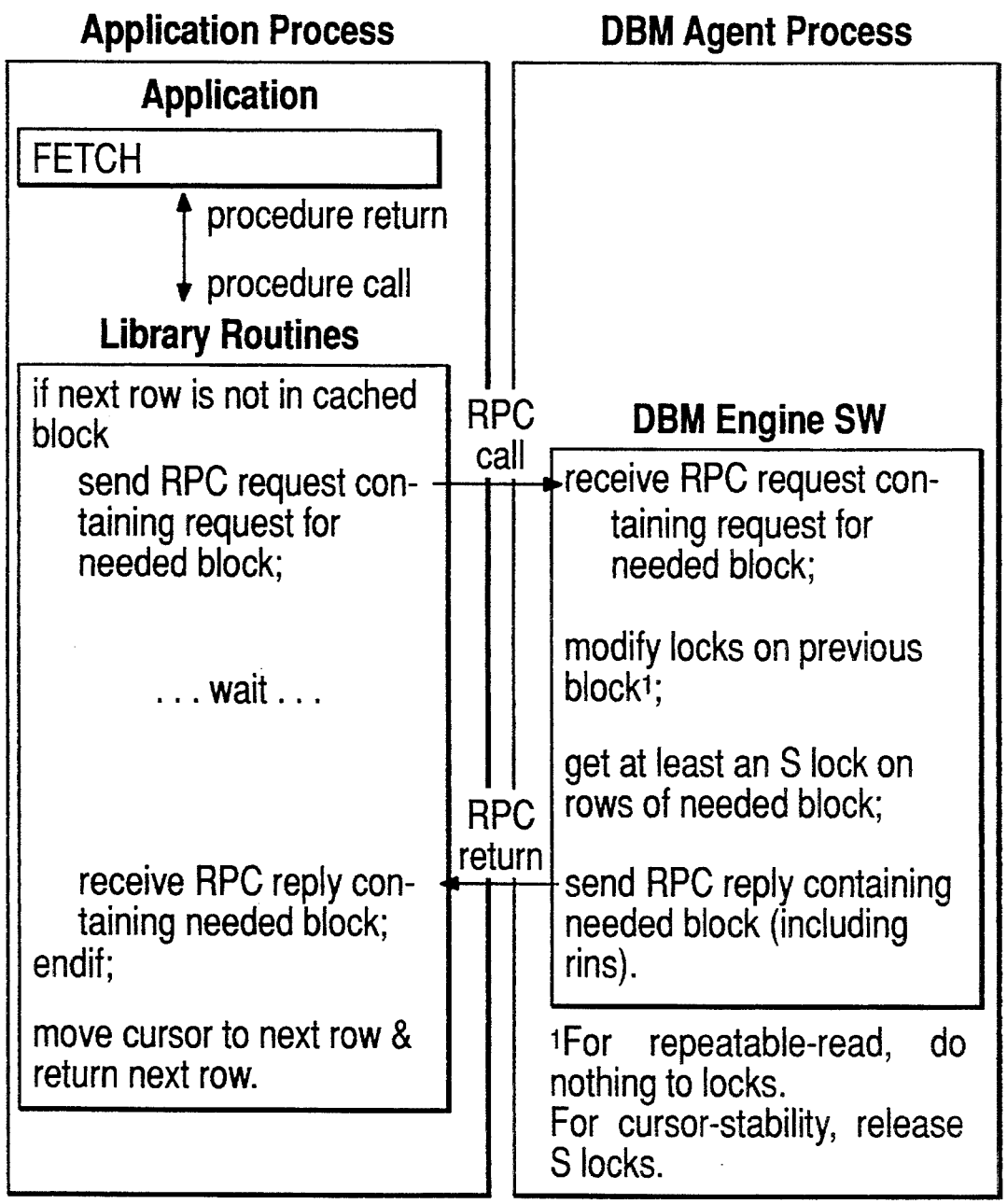
FIG. 7 is a flow diagram for an application process and a database manager process in accordance with the subject invention.

FIG. 7 provides a flow diagram between the APPL process and DBM process for a FETCH request for writethrough blocking. The APPL issues a FETCH request via the library routines in the APPL process. The library routines manage the local reserved area in the memory for blocking. If the row is in the reserved area in the memory, then it is simply fetched and returned locally without going to the DBM Agent, so the only overhead is a procedure call to the library routine. If the row is not in the reserved area in the memory, the library routine sends an RPC request to the DBM to get the required next block of rows. The DBM Agent process assigned to that request receives the RPC. It first modifies the locks on the previous block.

The rules for locking under repeatable-read isolation are:
Do nothing to the locks The rules for locking under cursor-stability isolation are:
Release the S locks.

The DBM Agent gets the next block of rows, which requires getting at least an S lock on each row in the block. Note that U locks are substituted for S locks under normal conditions. The DBM process then returns the block containing the rows with their unique identifiers back to the library routines in the APPL process. The APPL process then returns the next row to the APPL. This process continues until an EOF is reached.

Figure 8:
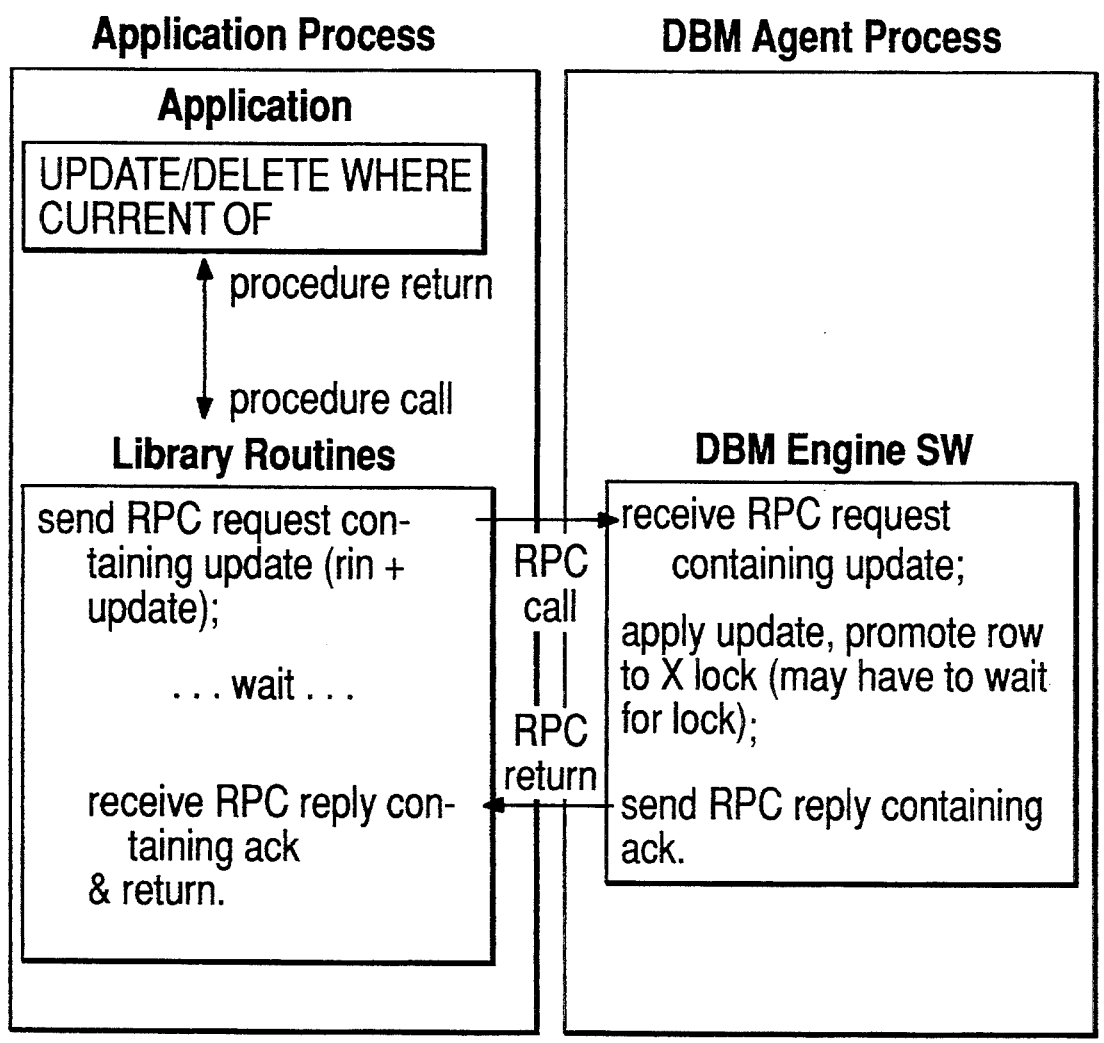
FIG. 8 is a flow diagram for an application process and a database manager process in accordance with the subject invention.

FIG. 8 is a flow diagram for an UPDATE/DELETE WHERE CURRENT OF request for writethrough blocking. The APPL issues an UPDATE/DELETE WHERE CURRENT OF request via the library routines in the APPL process. The updated row will always be in the reserved area in the memory, but the update must be synchronously sent to the DBM to be processes before returning to the APPL. The library routine sends an RPC to the DBM requesting the update. The DBM Agent process assigned to the request receives the RPC. It applies the update, which requires a promotion of the lock to X. Then, the DBM process returns the ack back to the library routines in the APPL process and onto the APPL.

Reserved Area in the Memory Consistency

If locking is not considered, then blocking can be considered as simply another occurrence of a reserved area in the memory management. However, locking assures consistency of data in the reserved area between transactions by preventing multiple transactions from updating the same data. This reduces to only intertransaction reserved area in the memory consistency problems.

In the current version of the Database Manager, only one application process can participate in a transaction, so no reserved area in the memory consistency problems can arise. In later releases, if multiple reserved areas in the memory are maintained for different application processes participating in a single transaction for the same table, then there is a possibility of reserved area in the memory inconsistencies.

When the reserved area in the memory manager detects an update to table TB from transaction TR, then it must invalidate all reserved area in the memory of cursors on TB within TR except the reserved area in the memory that was used with an UPDATE/DELETE WHERE CURRENT OF. That is, if a non-cursor update is requested to TB within TR, then the reserved areas in the memory must be invalidated for all cursors on TB within TR. If an UPDATE/DELETE WHERE CURRENT OF Ci is issues on TB within TR, then the reserved areas in the memory must be invalidated for all cursors on TB within TR except Ci. Reserved area in the memory invalidation requires the following extension to the flows:
- which reserved areas in the memory to invalidate must be determined
- the appropriate reserved areas in the memory are invalidated, which requires setting an invalidation flag for each reserved area in the memory in the APPL process.
- the test of whether the next row is in the reserved area in the memory must first check the invalidation flag.
- if the invalidation flag is set, then the request for the next block asks for the current block instead of the next block.
- the invalidation flag is cleared when the block arrives.

Figure 9:
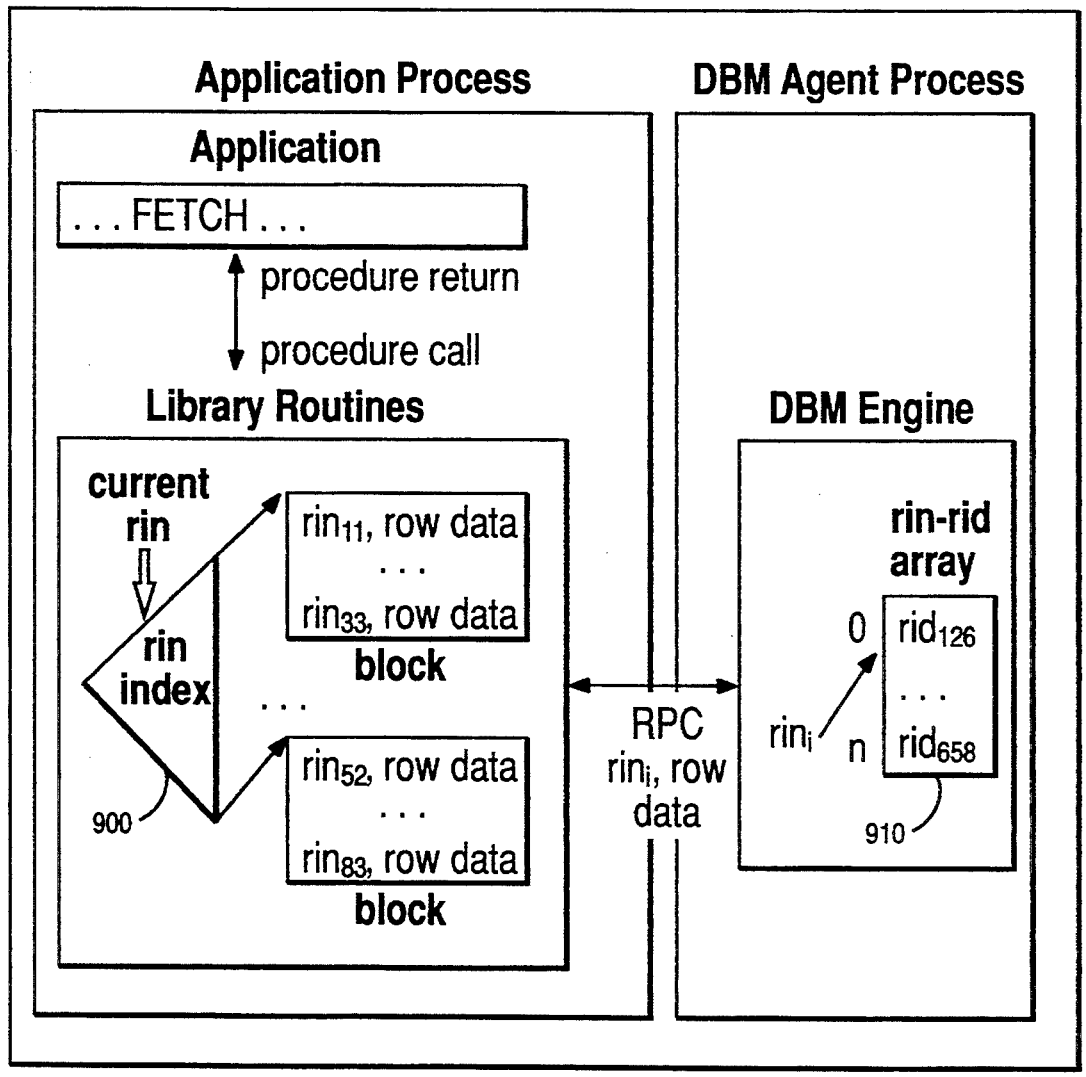
FIG. 9 is an illustration of the data structures in accordance with the subject invention.

FIG. 9 is an illustration of the data structures in accordance with the subject invention. For each open cursor, certain information must be maintained in the memory of the computer. First, the DBM assigns a contiguous row index number (RIN) 900 to the rows that qualify under the cursor predicated. An array 910 is also created to map the RIN to a Row identifier (RID). RINs are passed instead of RIDs between the application process and the DBM process, so that the application process cannot specify a row outside of those that qualify under a cursor predicate.

Then, the application process must maintain the RIN of the row corresponding to the cursor s current-row indicator and an index that maps RINs into the rows it has in the reserved area in the memory. The implementation of the index can be interchanged between a hash-table, B-Tree or a simple list based on user requirements.

While the invention has been described in terms of a preferred embodiment in a specific system environment, those skilled in the art recognize that the invention can be practiced, with modification, in other and different hardware and software environments within the spirit and scope of the appended claims.

Having thus described our invention, what we claim as new, and desire to secure by Letters Patent is:

1. A method for transferring information in blocks from a database server to a memory associated with a client application process, said method comprising the steps of:
    (a) building a reserved area in the memory;
    (b) checking the reserved area in the memory for a requested information;
    (c) sending a request for the requested information to the database server when the requested information is not in the reserved area in the memory, wherein said request includes updated information for a previous block;
    (d) receiving the request and updated information by the database server;
    (e) modifying locks and applying updated information to the previous block;
    (f) obtaining at least a demotable exclusive lock on the requested information;
    (g) sending the requested information from the database server to the client application process; and
    (h) placing the requested information in blocks in the reserved area in the memory,
    wherein said modifying step includes the steps of:
        in the case of a repeatable-read isolation level associated with said previous block, promoting an updated portion of said previous block to an exclusive lock, and demoting a non-updated portion of said previous block to a shared lock; and
        in the case of a cursor-stability isolation level associated with said previous block, promoting an updated portion of said previous block to an exclusive lock, and releasing a lock on a non-updated portion of said previous block.

2. A method for transferring information in blocks from a database server to a memory associated with a client application process, said method comprising the steps of:
    (a) building a reserved area in the memory;
    (b) checking the reserved area in the memory for a requested information;
    (c) sending a request for the requested information to the database server when the requested information is not in the reserved area in the memory, wherein said request includes updated information for a previous block;
    (d) receiving the request and updated information by the database server;
    (e) modifying locks and applying updated information to the previous block;
    (f) obtaining at least a demotable exclusive lock on the requested information;
    (g) sending the requested information from the database server to the client application process; and
    (h) placing the requested information in blocks in the reserved area in the memory,
    wherein said modifying step includes the steps of:
        in the case of a repeatable-read isolation level associated with said previous block, promoting an updated portion of said previous block to an exclusive lock if said updated portion had a demotable exclusive lock, demoting a non-updated portion of said previous block to a shared lock if said non-updated portion had a demotable exclusive lock, and not changing the lock if said portion had an exclusive lock; and
        in the case of a cursor-stability isolation level associated with said previous block, promoting an updated portion of said previous block to an exclusive lock if said updated portion had a demotable exclusive lock, demoting a non-updated portion of said previous block to no lock if said non-updated portion had a demotable exclusive lock, and not changing the lock if said portion had an exclusive lock.

3. A method as recited in claim 2, including the step of balancing a fetching of information by adjusting the size of the information in blocks.

4. A method as recited in claim 2, including the step of updating the locks to support writethrough blocking.

5. A method as recited in claim 2, including the step of updating the locks to support writeback blocking.

6. A method as recited in claim 2, including the step of scrolling a database cursor based on information in the reserved area in the memory, and the locks.

7. An apparatus for transferring information in blocks from a database server to a memory associated with a client application process, comprising:
    (a) means for building a reserved area in the memory;
    (b) means for checking the reserved area in the memory for a requested information;
    (c) means for sending a request for the requested information to the database server when the requested information is not in the reserved area in the memory, wherein said request includes updated information for a previous block;
    (d) means for receiving the request and updated information, said receiving means coupled to the database server;
    (e) means for modifying locks and applying updated information to the previous blocks;
    (f) means for obtaining at least a demotable exclusive lock on the requested information;
    (g) means for sending the requested information from the database server to the client application process; and
    (h) means for placing the requested information in blocks in the reserved area in the memory,
    wherein said modifying means includes:
        in the case of a repeatable-read isolation level associated with said previous block, means for promoting an updated portion of said previous block to an exclusive lock, and means for demoting a non-updated portion of said previous block to a shared lock; and in the case of a cursor-stability isolation level associated with said previous block, means for promoting an updated portion of said previous block to an exclusive lock, and means for releasing a lock on a non-updated portion of said previous block.

8. An apparatus for transferring information in blocks from a database server to a memory associated with a client application process, comprising:

(a) means for building a reserved area in the memory;

(b) means for checking the reserved area in the memory for a requested information;

(c) means for sending a request for the requested information to the database server when the requested information is not in the reserved area in the memory, wherein said request includes updated information for a previous block;

(d) means for receiving the request and updated information, said receiving means coupled to the database server;

(e) means for modifying locks and applying updated information to the previous blocks;

(f) means for obtaining at least a demotable exclusive lock on the requested information;

(g) means for sending the requested information from the database server to the client application process; and (h) means for placing the requested information in blocks in the reserved area in the memory, wherein said modifying means includes:

in the case of a repeatable-read isolation level associated with said previous block, means for promoting an updated portion of said previous block to an exclusive lock if said updated portion had a demotable exclusive lock, means for demoting a non-updated portion of said previous block to a shared lock if said non-updated portion had a demotable exclusive lock, and means for not changing the lock if said portion had an exclusive lock; and in the case of a cursor-stability isolation level associated with said previous block, means for promoting an updated portion of said previous block to an exclusive lock if said updated portion had a demotable exclusive lock, means for demoting a non-updated portion of said previous block to no lock if said non-updated portion had a demotable exclusive lock, and means for not changing the lock if said portion had an exclusive lock.

9. Apparatus as recited in claim 8, including means for balancing a fetching of information by adjusting the size of the information in blocks.

10. Apparatus as recited in claim 8, including means for updating the locks to support writethrough blocking.

11. Apparatus as recited in claim 8, including means for updating the locks to support writeback blocking.

12. Apparatus as recited in claim 8, including means for scrolling a database cursor based on information in the reserved area in the memory, and the locks.

* * * * *